Sept. 3, 1940.  J. MIHALYI  2,213,741
FEELABLE INDICATOR FOR FILM HANDLING APPARATUS
Filed Oct. 26, 1938
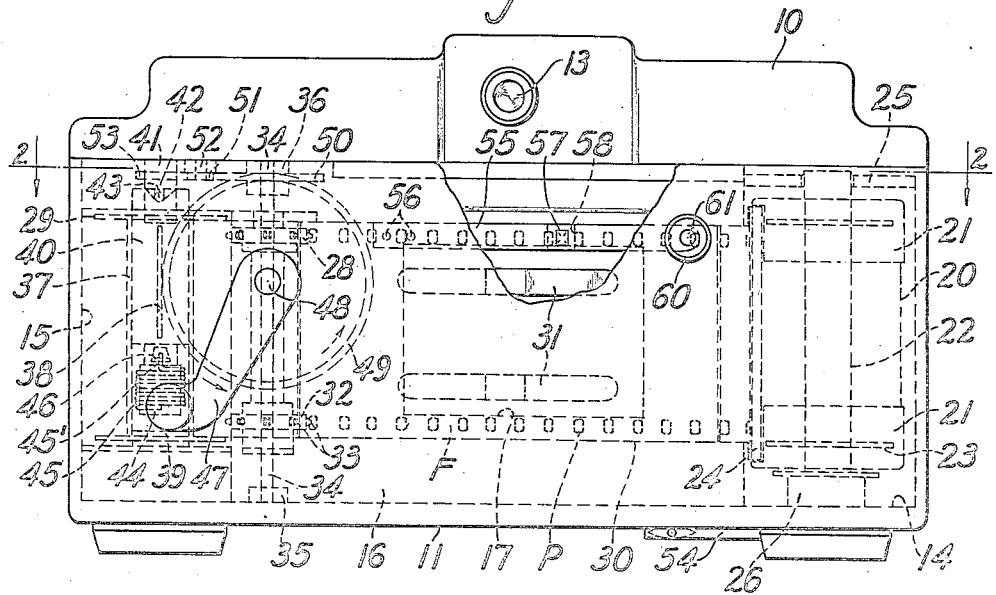
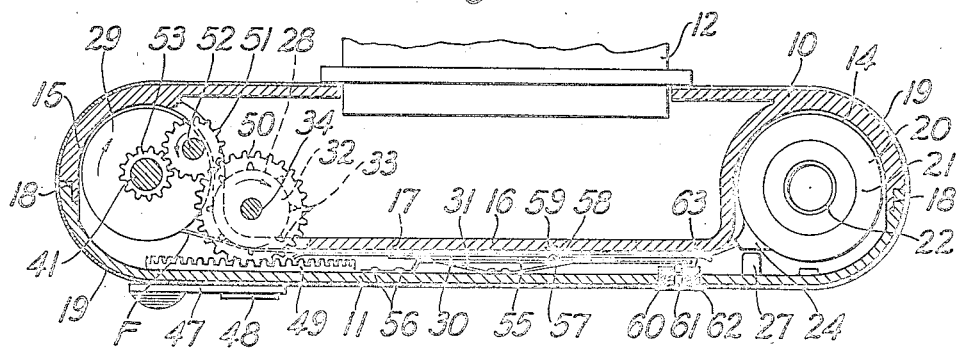
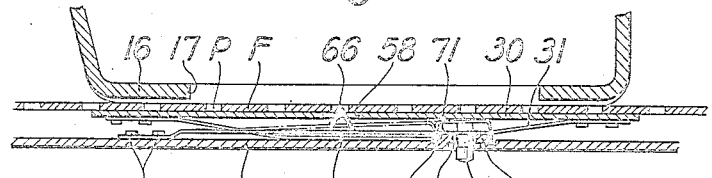
Joseph Mihalyi
INVENTOR
BY
ATTORNEYS Patented Sept. 3, 1940

2,213,741

UNITED STATES PATENT OFFICE 2,213,741

FEELABLE INDICATOR FOR FILM HANDLING APPARATUS

Joseph Mihalyi, Rochester, N. Y., assignor to Eastman Kodak Company, Rochester, N. Y., a corporation of New Jersey Application October 26, 1938, Serial No. 237,077
In Germany May 28, 1938

5 Claims. (Cl. 116—114)

The present invention relates to a feelable indicator for film handling apparatus and more particularly to a pulsating means communicable to the operator of the apparatus to advise him that film is moving therethrough. Under many conditions, film advancement may fail in a film handling apparatus without the operator being aware of such failure. This is particularly true of film cameras handling sensitized film which, of course, must be tightly enclosed within the camera. Some of the causes for failure of film movement are the tearing of perforations in the film and consequent inoperativeness of the film advancing mechanism or the failure of the take-up means also resulting in cessation of film movement. In any event the operator may believe that film is being moved through the camera when such is not the case and may endeavor to make exposures without any film in the exposure area or with the same portion of film in the exposure area for two or more exposures.

The primary object of the present invention is the provision of a feelable pulse arranged to be operated by movement of the film and for imparting to the operator a feelable sensation when film is being moved through a film handling apparatus.

Another object of the invention is the provision on a film handling apparatus of a feelable pulse which is operated directly by the film or abutments thereon or perforations therein.

A still further object of the invention is a feelable pulse including a film contacting member normally in contact with the film and operated by abutments on the film when the film is moved.

Other and further objects of the invention will be clear to those skilled in the art from the disclosure which follows.

The above and other objects of the invention are embodied in a film handling apparatus having a film driving means for moving a film strip and having a feelable means arranged to be operated by the movement of the film and for imparting pulsating sensation to the operator.

Reference is hereby made to the accompanying drawing wherein similar reference characters designate similar elements and wherein:

Fig. 1 is a rear elevation of a film handling apparatus provided with a feelable pulse according to the invention.

Fig. 2 is a longitudinal section through such a film handling apparatus taken on the line 2—2 of Fig. 1.

Fig. 3 is a partial longitudinal section through a film handling apparatus equipped with a modified form of the feelable pulse of the invention.

Although the feelable pulse of the invention is shown herein as being operated by the perforations or margins of the perforations of a standard film strip, it is to be understood that such feelable pulse may also be operated by embossings in the film or other protuberances attached to the film and that the term "abutments" as used in the specification and claims is intended in a generic sense and includes film perforations or the margin thereof, embossings in the film or protuberances attached to the film.

The film handling apparatus shown by way of example comprises a camera of the miniature type. Such a camera may have a casing 10 enclosed by a removable back member 11.

More specifically, the casing 10 may carry an objective mount 12, see Fig. 2, and a view finder 13, see Fig. 1. Internally, the casing 10 may have a film supply chamber 14, a film take-up chamber 15, and an intervening partition 16 which is provided with an exposure opening 17. The adjoining edges of casing 10 and back member 11 are rabbeted as at 18, see Fig. 2, to form light-tight joints therebetween, while said casing 10 and back member 11 both have a leather covering 19.

The film supply is preferably provided within a film magazine 20 having end caps 21 in which the tubular hub 22 of a flanged spool 23 is journaled. The film is wound in the usual manner within film magazine 20 upon the spool 23 and extends through the film exit 24 of film magazine 20. Said film magazine 20 is placed within the film supply chamber 14, is supported at one end by the extension of tubular hub 22 bearing in end partition 25 of casing 10 and at the other end by a clutch member 26 engaging the other end of tubular hub 22. A ridge member 27 on back member 11 extends into supply chamber 14 adjacent the film exit 24 of magazine 20 to prevent rotation of the magazine within said chamber 14.

The film F extends from the exit 24 of film magazine 20 along partition 16, over exposure opening 17, past a sprocket 28 and onto the take-up spool 29. The film F is preferably held flat over said exposure opening 17 by a pressure plate 30 mounted by springs 31 upon the removable back member 11 and urged by said springs 31 toward partition 16 and opening 17 when the back member 11 is fastened onto casing 10.

The film driving means may comprise either a sprocket drive for the film, a take-up drive, or a rewinding arrangement, all to be described hereinafter.

The sprocket film driving means comprises the sprocket 28 composed of collars 32 carrying teeth 33 and mounted upon a shaft 34 which is journaled in bearings 35 and 36 on opposite sides of the interior of casing 10.

The take-up film driving means comprises the flanged take-up spool 29 having a tubular hub 37 which is provided with a film slot 38. Said tubular hub 37 is rotatably supported within the film take-up chamber 15 of casing 10 by means of a bushing 39, a clutch shaft 40 and a stub shaft 41 on casing 10 and extending into clutch shaft 40. The stub shaft 41 carries a pin 42 engaging in a slot 43 in the end of clutch shaft 40. The clutch shaft 40 has a portion 44 of reduced diameter about which a coil spring 45 is wrapped. A tongue 46 is formed inwardly of the tubular hub 37 and is provided with a hole for receiving the end 45' of said coil spring 45. This arrangement within tubular hub 37 constitutes an over-running clutch, the purpose and function of which will be later described.

A winding handle 47 is rotatably mounted upon back member 11 and is attached to a stud 48 extending through said back member 11 and carrying a crown gear 49. A pinion gear 50 is mounted upon shaft 34 so that movement of handle 47 in a counter-clockwise direction, indicated by the arrow on Fig. 1, will cause rotation of pinion gear 50 and sprocket 28 in a clockwise direction, indicated by the arrow in Fig. 2, and advancement of the film F into the film take-up chamber 15.

The film take-up is illustrated herein as being operated from the sprocket film driving means but it is to be understood that such take-up may be operated independently or may be the only means for moving the film into the take-up chamber 15. A pinion 51 is mounted on shaft 52 on the interior of casing 10 and meshes with a second pinion 53 mounted on the stub shaft 41. Referring to Fig. 2, it will be noted that movement of pinion 50 in a clockwise direction rotates pinion 51 in a counter-clockwise direction which in turn rotates pinion 53 and shaft 41 in a clockwise direction. Such clockwise movement is transmitted by pin 42 and slot 43 to clutch shaft 40 and to the portion 44 thereof. The frictional engagement between coil spring 45 and portion 44 transmits this motion to the tongue 46 and to the tubular hub 37 of take-up spool 29. It will be realized by those skilled in the art that take-up spool 29 must be driven sufficiently so as to wind on its smallest diameter the film which is being advanced by the sprocket 28 but such take-up drive must also provide for slippage when the diameter of the take-up spool increases and its peripheral speed exceeds that of the sprocket 28. Such compensating slip is accomplished in the disclosed take-up arrangement between portion 44 of clutch shaft 40 and coil spring 45. When the diameter of the film on take-up spool 29 is greater than the minimum diameter, portion 44 will tend to turn coil spring 45 at a rotational speed greater than that required to take up the film passing sprocket 28 and will tend to unwrap spring 45 from portion 44 to permit whatever slip is necessary.

The rewinding film driving means comprises a winding handle 54 rotatably mounted in a side wall of casing 10 and connected to clutch member 26 which engages the tubular hub 22 of the supply film magazine 20. When it is desired to return the exposed film to magazine 20, said winding handle 54 is rotated in a known manner to rewind the film into magazine 20 and to move the film F in a reverse direction over the exposure opening 17.

Since movement of the film F by any one or more of the film driving means above described may fail, it is quite necessary or convenient to be able to verify whether or not film movement is occurring and the feelable means or pulse of the present invention is directed to verification of the film movement within a film handling apparatus, particularly a camera which is handling light-sensitive film not readily available for inspection.

The feelable means or pulse of the present invention is arranged to be operated directly by the film itself during movement thereof. Such a feelable means may comprise a film contacting member and a touchable member. Although the touchable member may itself be operated directly by the abutments on the moving film strip, excessive pressure on such a touchable member would mutilate the film strip or perforations therein and an intermediate film contacting member of a resilient nature is to be preferred.

One form of the film contacting member is shown in Fig. 2 and comprises a spring arm 55 fastened to the interior of back member 11, such as by rivets 56, and carring a tooth 57 which preferably has rounded or tapered sides. The pressure plate 30 is provided with a notch 58 and the partition 16 is provided with a recess 59, both opposite the tooth 57 which is normally urged into engagement with the film F or its perforations or which may pass through the perforations of the film into recess 59. Spring arm 55 is preferably biased to press against the film F as shown in Fig. 2 so that tooth 57 normally engages the film, its abutments or perforations.

The touchable member comprises a hollow bushing 60 mounted in removable back member 11 and containing a finger pin 61 and coil spring 62. Bushing 60 is inwardly dished at its outer end and is enclosed at its inner end by a plate 63. Coil spring 62 tends to retract finger pin 61 into the casing and to move it against the end of spring arm 55 so that said pin 61 cannot move freely under the action of gravity.

During any of the film winding or film driving operations of the camera, the operator may hold a finger against the pin 61. If a film strip is being moved through the camera by any of the said driving means, the tooth 57 and spring arm 55 will be oscillated or intermittently actuated by the abutments on the film or margins of the perforations in the film. The perception of such pulsations or oscillations through the operator's sense of touch will advise him that the film strip is being moved. On the contrary, if no such pulsations are felt during operation of one of the film driving means, the operator is immediately informed that some abnormal condition exists and that the film is not being moved across the exposure area of the camera.

Alternatively, the feelable means or pulse may be arranged to function only when under pressure of the operator's finger and this embodiment of the invention is shown in Fig. 3. As before, the film contacting member is fastened to the inside of the back member 11 and comprises a spring arm 64 fastened by rivets 65 to said back member 11. Said spring arm 64 carries a nose 66 adapted to extend through the opening 58 in pressure plate 30 to engage the film F and particularly the perforations p thereof. Said spring arm 64 is arranged so that the nose 66 is normally spaced from the film and its perforations.

The touchable member of the second embodiment comprises a finger pin 67 which extends through a hole 68 provided with a bushing 69 on back member 11. Said finger pin 67 is attached to the free end of spring arm 64.

In order to prevent or reduce the light leak around the touchable member, a light-tight joint is provided between said spring arm 64 and the removable back member 11 or the bushing 69 therein. Such a light-tight joint comprises an annular groove 70 provided in back member 11 and encircling said bushing 69, and a cup 71 formed in the end of spring member 64 and encircling the finger pin 67. Thus any light passing between finger pin 67 and the hole 68 is trapped by the cup 71 and the annular groove 70.

It will now be clear that according to either form of the invention an operator may ascertain or vertify whether or not the film is being moved through the film handling apparatus when the film driving means, such as the sprocket drive, take-up drive and/or rewind drive, is operative. Such a feelable footage indicator is a convenient and very useful adjunct to a film handling apparatus and especially a camera for sensitized film.

Since other modifications of the invention are possible, the present disclosure is merely illustrative. It shall be understood that the feelable pulse of the invention may be operated by movement of the film, such as engagement with abutments on the film. Such abutments including perforations, the margins of perforations, embossings in the film, or protuberances attached to the film. The scope of the invention is defined by the claims which follow.

Having now particularly described my invention what I desire to secure by Letters Patent of the United States and what I claim is:

1. In a film handling apparatus, the combination with a film driving means for moving through said apparatus a film strip which has spaced abutments, of a feelable means including a film contacting member having a cam surface located and arranged merely to bear against the abutments of said film and to be directly and intermittently actuated by the abutments on said film upon movement thereof and including a touchable member operated by said film contacting member.

2. In a film handling apparatus, the combination with a film driving means for moving through said apparatus a film strip which has spaced abutments, of a feelable means including a film contacting member having a cam surface normally pressed toward the film strip merely to bear against said abutments and operated upon movement of said film by the abutments thereon, and a touchable member available to the touch of the operator and operated by said film contacting member.

3. In a film handling apparatus, the combination with a light tight casing and a film through said apparatus a film strip which has spaced abutments, of a feelable means including a film contacting member having a cam surface normally positioned out of contact with the film strip and a touchable member for moving said cam surface of the film contacting member into engagement with said film strip and for receiving pulsations from said abutments upon movement of said film strip by the film driving means.

4. In a film handling apparatus, the combination with a light-tight casing, and a film driving means in said casing for moving through said apparatus a sensitized and perforated film strip, of a film contacting member mounted within said casing and having a cam surface resiliently urged into engagement with said perforated film strip and arranged to be operated intermittently by said perforated film strip upon movement thereof, a light sealing bushing on said casing, and a touchable member mounted in said bushing and spring pressed inwardly of said casing toward said film contacting member for operation thereby.

5. In a film handling apparatus, the combination with a light-tight casing, and a film driving means in said casing for moving through said apparatus a sensitized and perforated film strip, of a film contacting member mounted within said casing and having a cam surface movable into contact with said perforated film strip and operated intermittently by said perforated film strip upon movement thereof, a finger member extending through said casing and operated by said film contacting member, and a light sealing member movable with said finger member and in light sealing relation to said casing.

JOSEPH MIHALYI.